March 31, 1942.  W. BECHT  2,277,839

INTERNAL COMBUSTION ENGINE

Filed Dec. 15, 1938

Inventor:
WALTER BECHT
By
Attorneys

Patented Mar. 31, 1942

2,277,839

UNITED STATES PATENT OFFICE 2,277,839

INTERNAL COMBUSTION ENGINE

Walter Becht, Stuttgart-Bad Cannstatt, Germany, assignor to Dr. ing. h. c. F. Porsche K.-G., Stuttgart-Zuffenhausen, Germany Application December 15, 1938, Serial No. 245,806
In Germany January 7, 1938

1 Claim. (Cl. 60—13)

This invention relates to improvements in internal combustion engines, particularly such engines which are provided with a supercharger or other accessory which is driven by means of an exhaust turbine, and it is an object of the invention to improve the construction so that the temperature of the gas turbine runner will not become excessively high.

It is well known that the durability of an exhaust gas turbine is greatly reduced when the operating temperature of the runner or rotor becomes very high. This is due in part to the reduction in strength of the material due to the high temperature and in part to the resulting high temperatures to which the bearings are subjected. It has been found very difficult to overcome these objections either by suitable choice of material of the runner or by improving the construction of the bearing. More satisfactory results have however been achieved when the temperature of the runner itself is kept at a lower point. This might be accomplished by passing a cooling air stream through axial conduits in the runner itself and similarly air be passed through conduits or passages in the turbine blade itself. These proposals, however, involve complications of construction and greatly increase the cost of manufacture so that they cannot be applied in the case of smaller power plants.

It is an object of the present invention to overcome these difficulties as by so arranging the exhaust gas turbine that that side of the runner or rotor opposite to the nozzles is subjected to a cooling stream of air.

Another object is to utilize therefore the air stream delivered by the blower associated with an air cooled internal combustion engine.

It is another object to arrange the cooling in such a way that the air used to cool the exhaust turbine is first utilized to cool the cylinders of the internal combustion engine.

Figure 1:
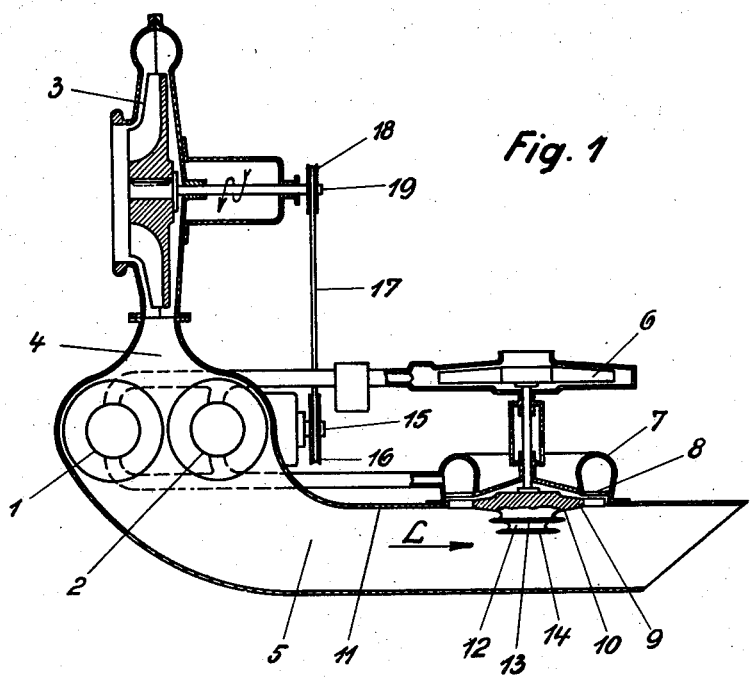
Figure 2:
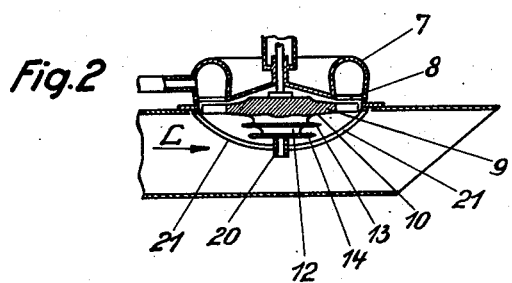

Other objects and advantages of the present invention will be apparent from consideration of the specification as illustrated by the accompanying drawing in which:

Fig. 1 shows schematically a possible arrangement of blower, engine, supercharger and exhaust gas turbine in accordance with the teachings of the present invention; and Fig. 2 is a partial schematic view of the exhaust gas turbine of Fig. 1, illustrating a slightly modified structural arrangement.

Referring to Fig. 1, the numerals 1 and 2 indicate two cylinders of an internal combustion engine, preferably of the air cooled type. The numeral 3 indicates a blower which may be driven in any suitable manner by the engine 1, as by the belt 17 connected to pulley 18 on blower shaft 19, for delivering cooling air for cooling the cylinders, the air being delivered through conduit 4. After passing the cylinders, the air passes along through a conduit 5. The numeral 6 indicates a supercharger blower which, as shown, is driven by an exhaust gas turbine 7 having turbine nozzles 8 serving to direct the exhaust gases of the internal combustion engine against the turbine rotor 9.

It will be seen that the side 10 of the rotor which faces away from the turbine nozzle lies substantially in the line of the wall 11 of the conduit 5 so that it is subjected directly to the cooling effect of the air passing through said conduit in the direction of arrow L. It will be seen that in this way effective cooling of the turbine runner can be had without adding to the cost of construction and without subjecting the cooling air to substantial resistance to its flow. To further increase the cooling it may be desirable to provide the side 9 of the rotor with an extension 12, which, if desired, may be provided with cooling ribs 13 and 14. Experience has shown that in this manner a very substantial reduction of the temperature of the turbine runner can be achieved and that as a result thereof the effective life of the turbine is greatly increased.

It will be noted that in the form shown the cooling air comes into engagement with the exhaust gas turbine runner after it has passed the engine cylinders. This has the advantage that the cooling effect of the air upon the internal combustion engine cylinders is not materially reduced. On the other hand, there is still ample cooling effect to reduce the temperature of the exhaust turbine motor. This becomes obvious when it is understood that the temperature increase of the cooling air while passing by the engine cylinders is probably not much more than 30 or 40° C. so that the temperature of the air which strikes the exhaust gas turbine rotor is still comparatively low considering that the temperature of the rotor will often reach 450 to 500° C., so that the temperature increase at the motor cylinders is substantially negligible. That the cooling effect upon the rotor is very substantial becomes obvious when it is considered that the velocity of the air flow through conduit 5 may reach 30 to 40 meters per second and that the change of air relative to the rotor is further increased by the rotation of the rotor itself, as the discharge of the exhaust gases from the rotor at high speed produces a suction or ventilating action which will pull in a greater amount of the air passing through the conduit 5, about and alongside the turbine rotor. As a result, a greater cooling effect is produced compared, for example, to a stationary object.

In Fig. 2 there is illustrated a modified exhaust turbine structure, wherein the turbine rotor is provided with a bearing 20 on that side of the rotor which extends into the conduit 5. The bearing is supported by suitable ribs 21, and as the bearing is in the path of the cooling air, it is obvious that the same will be well cooled and will not be subjected to dangerous overheating, which so frequently reduces the life of exhaust gas turbines.

The invention may be utilized with either engines of the Otto type, Diesel engines, internal combustion turbines or with any other device where it is applicable. Furthermore, it is unimportant whether the engines in question are of the stationary type or are used in motor vehicles, boats, ships, or airplanes.

It will be noted that the construction shown and described will serve admirably to accomplish the objects stated above. It is to be understood however that the construction disclosed is merely schematic and is intended merely as illustrative of the invention and not as limiting, as various modifications therein may be made without departing from the invention as defined by a proper interpretation of the claim which follows.

I claim:

In combination, an internal combustion engine having one or more cylinders, means for directing cooling air about said cylinders, a conduit for guiding said air away from said cylinders, provided with a side wall having an opening therein, and a turbine connected for actuation by the exhaust gases from said cylinders, said turbine having a rotor lying in said opening substantially flush with said wall of said conduit, whereby the exhaust gases are delivered into said conduit and said rotor is subjected to contact with the air passing therethrough for cooling of the same.

WALTER BECHT.